(12) United States Patent
Kweon et al.

(10) Patent No.: US 10,419,684 B2
(45) Date of Patent: Sep. 17, 2019

(54) APPARATUS AND METHOD FOR ADJUSTING CAMERA EXPOSURE

(71) Applicant: KOREA ADVANCED INSTITUTE OF SCIENCE AND TECHNOLOGY, Daejeon (KR)

(72) Inventors: In-So Kweon, Daejeon (KR); In wook Shim, Daejeon (KR); Joon Young Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 288 days.

(21) Appl. No.: 15/249,585

(22) Filed: Aug. 29, 2016

(65) Prior Publication Data
US 2017/0078551 A1 Mar. 16, 2017

(30) Foreign Application Priority Data
Sep. 10, 2015 (KR) .................. 10-2015-0128416

(51) Int. Cl.
*H04N 5/235* (2006.01)

(52) U.S. Cl.
CPC ......... *H04N 5/2351* (2013.01); *H04N 5/2352* (2013.01)

(58) Field of Classification Search
CPC .. H04N 5/2353; H04N 5/2351; G06T 7/0002; G06T 7/0085
See application file for complete search history.

(56) References Cited

U.S. PATENT DOCUMENTS

| | | | |
|---|---|---|---|
| 4,423,936 | A | 1/1984 | Johnson |
| 5,592,256 | A | 1/1997 | Muramatsu |
| 6,636,646 | B1 | 10/2003 | Gindele |
| 7,289,154 | B2 | 10/2007 | Gindele |

(Continued)

FOREIGN PATENT DOCUMENTS

| | | |
|---|---|---|
| KR | 10-2012-0004092 | 1/2012 |
| KR | 10-2014-0045370 | 4/2014 |

OTHER PUBLICATIONS

Stephen Nuske et al., "Extending the dynamic range of robotic vision", IEEE International Conference on Robotics and Automation, May 2006.

(Continued)

*Primary Examiner* — Roberto Velez
*Assistant Examiner* — Tuan H Le
(74) *Attorney, Agent, or Firm* — Lex IP Meister, PLLC (57) ABSTRACT

As an apparatus for adjusting camera exposure, the apparatus includes: a virtual image generator generating a plurality of virtual images by changing brightness of an image photographed by a camera; a feature image generator generating a plurality of feature images respectively indicating features of the plurality of virtual images; and an exposure controller corresponding a feature value of the plurality of feature images to brightness, estimating reference brightness that corresponds to the maximum feature value, increasing camera exposure when the reference brightness is brighter than the photographed image, and decreasing the camera exposure when the reference brightness is darker than the photographed image.

17 Claims, 11 Drawing Sheets

(56) References Cited

U.S. PATENT DOCUMENTS

2008/0055683 A1* 3/2008 Choe .................. H04N 1/387
358/525
2015/0222800 A1* 8/2015 Hirooka .............. H04N 5/2353
348/364
2016/0212316 A1* 7/2016 Nagashima .......... H04N 5/2353

OTHER PUBLICATIONS

Stefan Hrabar et al., "High dynamic range stereo vision for outdoor mobile robotics", IEEE International Conference on Robotics and Automation, May 2009, p. 430-435.
Wen-Chung Kao et al., "Adaptive exposure control and real-time image fusion for surveillance systems", IEEE International Symposium on, May 2006, p. 935-938.
Huimin Lu et al., "Camera parameters auto-adjusting technique for robust robot vision", IEEE International Conference on Robotics and Automation, May 2010, p. 1518-1523.
Inwook Shim et al, "Auto-adjusting Camera Exposure for Outdoor Robotics using Gradient Information", IEEE/RSJ InternationalConference on Intelligent Robots and systems, Sep. 2016, p. 1011-1017.

* cited by examiner

APPARATUS AND METHOD FOR ADJUSTING CAMERA EXPOSURE

CROSS-REFERENCE TO RELATED APPLICATION

This application claims priority to and the benefit of Korean Patent Application No. 10-2015-0128416 filed in the Korean Intellectual Property Office on Sep. 10, 2015, the entire contents of which are incorporated herein by reference.

BACKGROUND (a) Field

The present disclosure relates to an apparatus for adjusting camera exposure.

(b) Description of the Related Art

A conventional method for adjusting camera exposure determines an exposure value of a camera based on intensity of light of all pixels input to a sensor (CCD or CMOS) of the camera. However, a lighting environment such as outdoors is too various for a camera to determine an appropriate exposure value. In particular, in case of backlight photography, light existing in the background increases an average of the light amount so that camera exposure cannot be properly set, thereby darkening an object in the foreground.

In order to solve such a problem, a method of utilizing multiple images, such as through a high dynamic range (HDR) function, may be used. However, since multiple images are used, an image alignment problem occurs when taking a motion picture of a moving object or photographing of a moving object is performed, and exposure determination cannot be properly done when photographing multiple images. Meanwhile, a specific region of an image may be preset as a region of interest, and camera exposure may be adjusted for the best view of an image in the region of interest. However, this method is impractical because it can only be used when the camera is fixed or only in a known environment.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an apparatus for adjusting camera exposure using features of an image, and a method thereof.

An apparatus for adjusting camera exposure according to an exemplary embodiment includes: a virtual image generator generating a plurality of virtual images by changing brightness of an image photographed by a camera; a feature image generator generating a plurality of feature images respectively indicating features of the plurality of virtual images; and an exposure controller corresponding a feature value of the plurality of feature images to brightness, estimating reference brightness that corresponds to the maximum feature value, increasing camera exposure when the reference brightness is brighter than the photographed image, and decreasing the camera exposure when the reference brightness is darker than the photographed image.

The virtual image generator may change brightness of the photographed image through gamma correction using a plurality of gamma values included within a given range, and when the gamma value is greater than 1, the virtual image generator darkens the photographed image, and when the gamma value is smaller than 1, the virtual image generator brightens the photographed image for virtually adjusting an exposure value.

The feature value may include edge information or gradient information, and the feature image generator may generate a feature image corresponding to each virtual image by extracting a feature per pixel of each virtual image.

The feature image generator may extract an initial feature value per pixel of each virtual image and relatively correct the initial feature value using a nonlinear function, and the nonlinear function may be a function that restricts feature noises and relatively increases importance of a pixel having a smaller initial feature value.

The exposure value controller may calculate a total feature value of the corresponding feature image by adding up a feature value per pixel of each feature image, and may estimate brightness of an image having the greatest total feature value among the plurality of feature images as the reference brightness The exposure value controller may calculate a total feature value of the corresponding feature image by adding up a feature value per pixel of each feature image, generate a relationship graph of feature values and brightness by connecting points respectively corresponding to brightness and total feature value of each of the plurality of feature value images, and estimate brightness of the greatest total feature value in the graph as the reference brightness.

The exposure value controller may iteratively adjust camera exposure until a difference between the reference brightness and brightness of the photographed image converges to a certain range.

The virtual image generator may generate a virtual image corresponding to each gamma value by changing brightness of the photographed image using a plurality of gamma values used in gamma correction, and the exposure value controller may extract an estimation gamma value that corresponds to the maximum feature value using a relationship between a feature value acquired from the plurality of feature images and gamma values, increase camera exposure to be greater than an exposure value of the photographed image when the estimation gamma value is smaller than 1, and decrease the camera exposure to be lower than the exposure value of the photographed image when the estimation gamma value is greater than 1. The photographed image may become darker when the gamma value is greater than 1 and the photographed image may become brighter when the gamma value is smaller than 1 through the gamma correction.

The feature image generator may generate a feature image including gradient per pixel of each virtual image.

The exposure value controller may calculate a total gradient of a feature image corresponding to each virtual image, and may extract a gamma value of a virtual image having the greatest total gradient as the estimation gamma value.

According to another exemplary embodiment, a method for adjusting camera exposure by an apparatus is provided. The method includes: generating a plurality of virtual images by applying a plurality of gamma values used in gamma correction to an image photographed by a camera; calculating a feature value indicating edge or gradient information of each of the plurality of virtual images; estimating target gamma value that corresponds to the maximum feature value using a relationship between feature values of the plurality of virtual images and gamma values of the plurality of virtual images; and determining an exposure value of the camera based on the target gamma value.

The calculating the feature value may include calculating a total feature value of the corresponding virtual image by adding up a feature value per pixel of each virtual image.

The determining the exposure value of the camera may include: generating a relationship graph by connecting points that correspond to gamma value and a total feature value of each of the plurality of virtual images; extracting the target gamma value having the maximum feature value in the graph; and increasing the camera exposure to be greater than an exposure value of the photographed image when the target gamma value is smaller than 1 and decreasing the camera exposure to be lower than the exposure value of the photographed image when the target gamma value is greater than 1.

The determining the exposure value of the camera may include: extracting a virtual image having the greatest total feature value among the plurality of virtual images; extracting gamma value of the extracted virtual image as the target gamma value; and increasing the camera exposure to be greater than the exposure value of the photographed image when the target gamma value is smaller than 1 and decreasing the camera exposure to be lower than the exposure value of the photographed image when the target gamma value is greater than 1.

The photographed image may become darker when an applied gamma value is greater than 1 and the photographed image may become brighter when the applied gamma value is smaller than 1 through the gamma correction.

According to another exemplary embodiment, a method for adjusting camera exposure by an apparatus is provided. The method includes: receiving a first image photographed by a camera with a first exposure value; extracting a relationship graph of gamma values and gradient information that indicates edge information of an image using a plurality of virtual images acquired by performing gamma correction on the first image; and changing the first exposure value to a second exposure value based on a specific gamma value extracted from the relationship graph.

The extracting the relationship graph may include: generating a plurality of virtual image by gamma-correcting the first image; extracting a total gradient value of each of the plurality of virtual images; and generating the relationship graph by connecting points that correspond to gamma values of the respective virtual images and total gradient values, wherein a total gradient value of each virtual image may be acquired by adding up a gradient value per pixel of the corresponding virtual image.

The changing the first exposure value to the second exposure value may include: determining a gamma value having the maximum total gradient value in the relationship graph as the specific gamma value; and when the specific gamma value is greater than 1, a value that is smaller than the first exposure value is determined to be the second exposure value, and when the specific gamma value is smaller than 1, a value that is greater than the first exposure value is determining to be the second exposure value.

The specific gamma value may be a gamma value that maximizes gradient information of the first image in the relationship graph.

The changing to the second exposure value may include extracting an exposure ratio that corresponds to the specific gamma value based on an inversely proportional graph of a gamma value and an exposure ratio, and the exposure ratio may be a ratio of the second exposure value with respect to the first exposure value.

An apparatus for adjusting camera exposure according to an exemplary embodiment includes: a virtual image generator generating a plurality of virtual images by changing brightness of an image photographed by a camera; a feature image generator generating a plurality of feature images respectively indicating features of the plurality of virtual images; and an exposure controller corresponding a feature value of the plurality of feature images to brightness, estimating reference brightness that corresponds to the maximum feature value, increasing camera exposure when the reference brightness is brighter than the photographed image, and decreasing the camera exposure when the reference brightness is darker than the photographed image.

According to the exemplary embodiment of the present disclosure, camera exposure can be adjusted using features of an image and therefore camera exposure adjustment is less influenced by a lighting environment compared to a conventional method for adjusting camera exposure based on a light amount. Therefore, according to the exemplary embodiment of the present disclosure, camera exposure is adjusted using features of an image so that the camera operates more robustly to a lighting environment in a photographing environment, thereby acquiring a clear image.

DETAILED DESCRIPTION OF THE EMBODIMENTS

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

Figure 1:
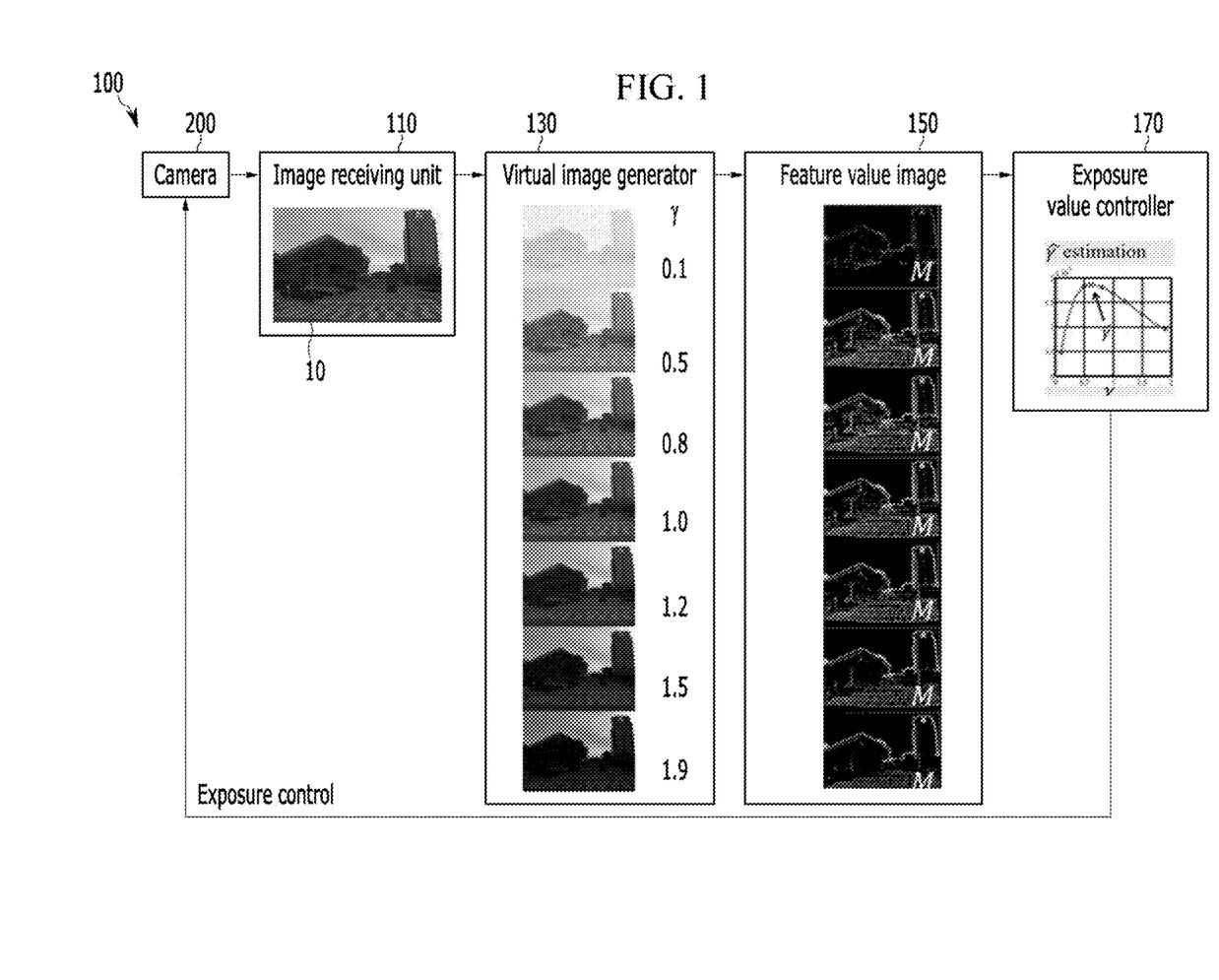
FIG. 1 is a schematic diagram of an apparatus for adjusting camera exposure according to an exemplary embodiment of the present disclosure.
Figure 2:
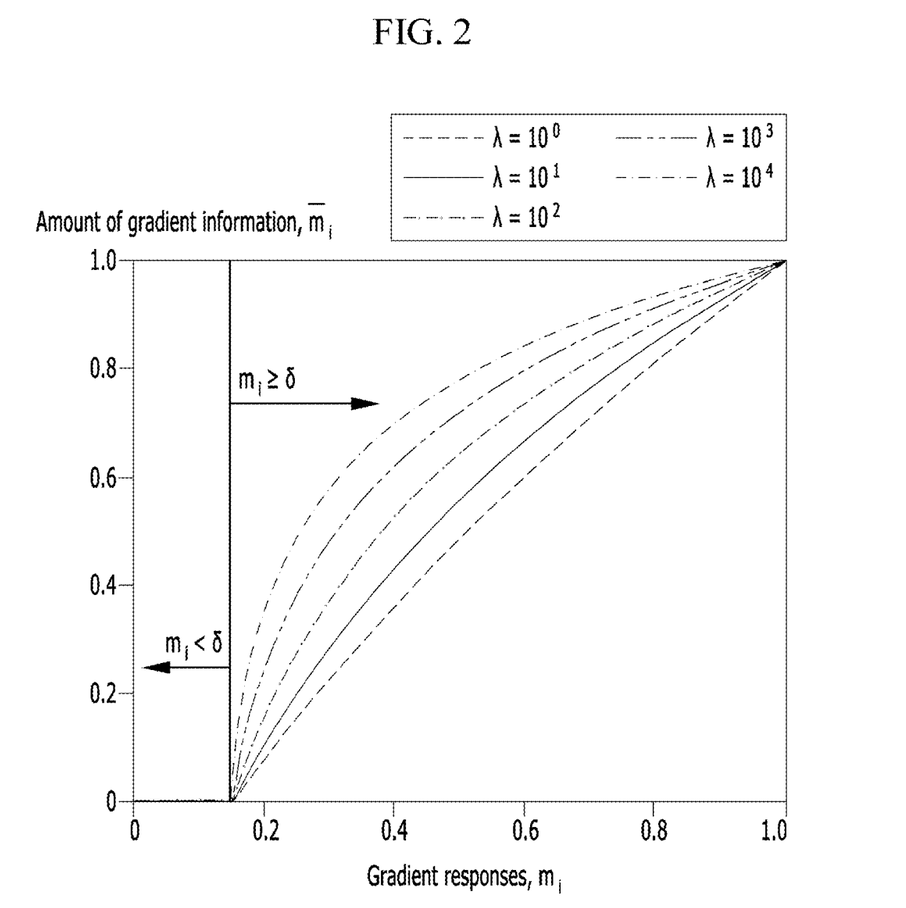
FIG. 2 is an example of a feature value transfer function according to the exemplary embodiment of the present disclosure.
Figure 3:
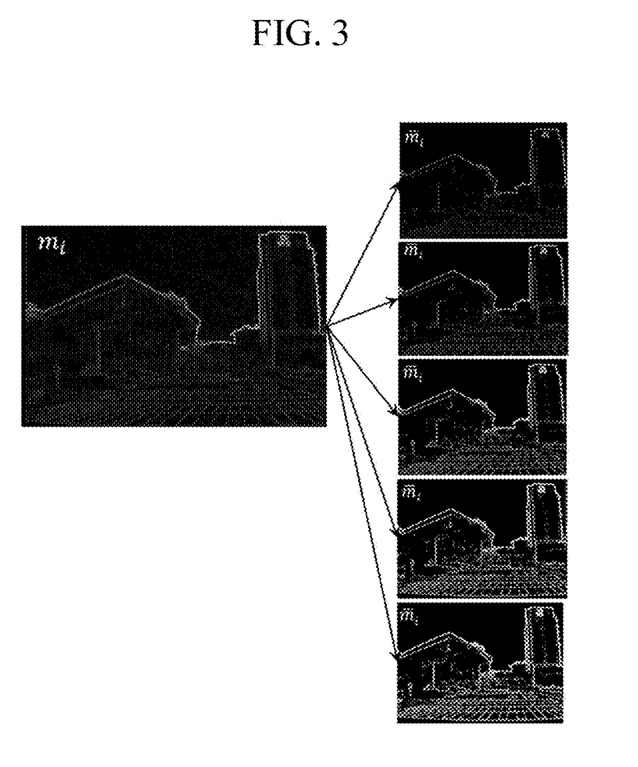
FIG. 3 is an example of a corrected feature value image according to the exemplary embodiment of the present disclosure.
Figure 4A:
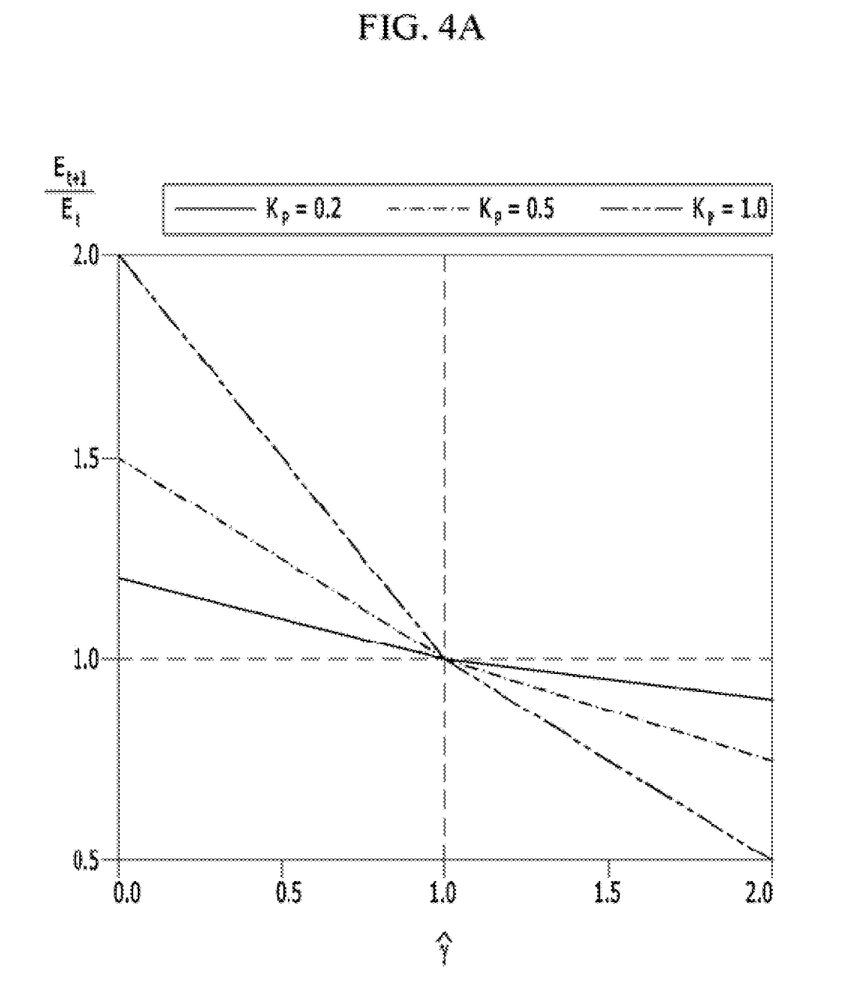
FIG. 4A and FIG. 4B show examples of an exposure value control function according to the exemplary embodiment of the present disclosure.
Figure 4B:
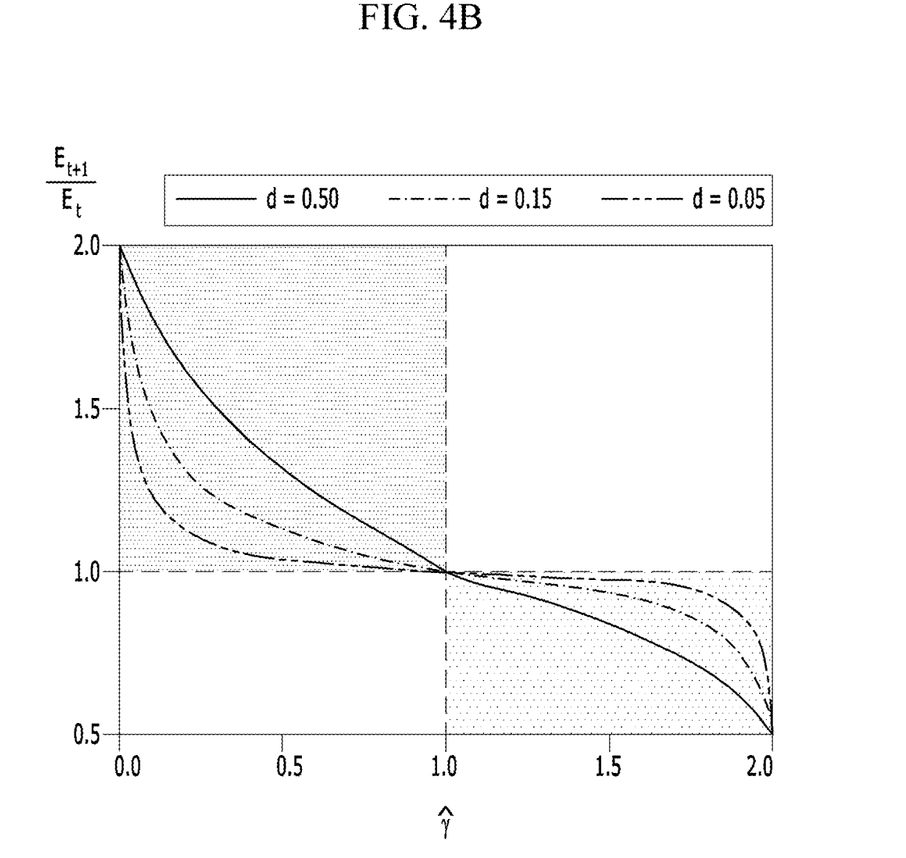

FIG. 1 is a schematic diagram of an apparatus for adjusting camera exposure according to an exemplary embodiment of the present disclosure, FIG. 2 is an example of a feature value transfer function according to the exemplary embodiment of the present disclosure, FIG. 3 is an example of a corrected feature value image according to the exemplary embodiment of the present disclosure, and FIG. 4A and FIG. 4B show examples of an exposure value control function according to the exemplary embodiment of the present disclosure.

Referring to FIG. 1, an apparatus for adjusting camera exposure (hereinafter referred to as a camera exposure adjusting apparatus) 100 adjusts an exposure value of a camera using features of an image. Here, the features include information on an edge or a gradient extracted from an image. Although it is described that the camera exposure adjusting apparatus 100 includes a camera 200 that takes a photograph of an image, the camera exposure adjusting apparatus 100 may be implemented separately from the camera. That is, the camera exposure adjusting apparatus 100 and the camera 200 may be integrally or separately implemented.

The camera exposure adjusting apparatus 100 extracts a relationship between an image feature and an exposure value of the camera 200, and retrieves an optimal exposure value by iteratively modifying the exposure value based on the extracted relationship. For this, the camera exposure adjusting apparatus 100 includes an image receiving unit 110, a virtual image generator 130, a feature image generator 150, and an exposure value controller 170. In addition, the exposure value controller 170 delivers an exposure value to the camera 200, and the image receiving unit 110 has a feedback structure and thus receives an image photographed using an adjusted exposure value from the camera 200. The feedback structure may be repeated until the camera exposure value is converged into the optimal value. In this case, the camera 200 may take a photograph or take a motion picture based on the exposure value received from the exposure value controller 170, and deliver information on the photographed picture or motion picture to the image receiving unit 110.

The image receiving unit 110 receives an image (i.e., a photographed image) 10 photographed by the camera 200 using a specific exposure value ($E_t$) from the camera 200.

The virtual image generator 130 generates a plurality of virtual images by variously modifying brightness of the photographed image. The virtual image generator 130 can modify brightness (i.e., intensity) of the photographed image using a method such as gamma correction. The virtual image generator 130 generates a plurality of virtual images 11, 12, 13, 14, 15, 16, and 17 by modifying a gamma value γ within a constant range (e.g., 0.1, 0.5, 0.8, 1.0, 1.2, 1.5, and 1.9). Intensity of a photographed image $l_{in}$ is modified to a virtual image) ($I_{out}=I_{in}^{\gamma}$) depending on the gamma value γ, and the gamma correction makes an input image dark when the gamma value γ is greater than 1 and makes the input image bright when the gamma value γ is smaller than 1. The virtual image generator 130 generates images that simulate a camera exposure change through gamma correction.

The feature image generator 150 generates feature images 21, 22, 23, 24, 25, 26, and 27 including a feature of each of the plurality of virtual images. The image feature includes edge information or gradient (v) information included in an image. The gradient is a function used to calculate a magnitude and a direction of an edge per pixel of an image, and a distance between a specific pixel and an edge and a direction of the edge can be determined by calculating a gradient [∇I(x,y)] of a function [I(x, y)], which indicates intensity of the image in the specific pixel [(x,y)]. Thus, edge information and gradient information can be combined and used.

Meanwhile, it is known that a gradient magnitude in the image has a heavy-tailed distribution characteristic. Thus, the gradient mostly has a relatively smaller value than the maximum gradient value, while the gradient is significantly increased at a boundary between a background and an object. If a gradient extracted from an image is directly used, a boundary between a background and an object, which has relatively less importance, is encoded as important information. Thus, the feature image generator 150 corrects a substantial gradient $m_i$ using the nonlinear function shown in FIG. 2 so as to balance importance between a small gradient and a large gradient. That is, the feature image generator 150 uses a nonlinear function that restricts feature noises and relatively increases importance of a pixel having a small gradient $m_i$.

The function of FIG. 2 can be represented as Equation 1. In Equation 1, $m_i$ denotes a gradient value at a pixel location i and $\overline{m}_i$ denotes a corrected gradient value. δ denotes a threshold value for determining noise, and λ denotes a control parameter that controls mapping tendency. N denotes a normalization factor that normalizes the corrected gradient by limiting an output range of the function to [0, 1].

$$\overline{m}_i = \begin{cases} \frac{1}{N}\log(\lambda(m_i - \delta) + 1) & \text{for } m_i \geq \delta \\ 0 & \text{for } m_i < \delta \end{cases} \quad \text{(Equation 1)}$$

$$\text{s.t. } N = \log(\lambda(1 - \delta) + 1)$$

Referring to FIG. 3, a feature image represented as a before-correction gradient $m_i$ has a significant edge/gradient at a boundary between a background and an object, but the edge/gradient at other regions is relatively small. The feature image generator 150 can increase the edge/gradient at the regions where the edge/gradient is low by adjusting δ and λ such that a plurality of feature images represented as an after-correction gradient $\overline{m}_i$ can be generated.

The exposure value controller 170 calculates the entire edges or the entire gradients of the corresponding image by adding up gradients of all pixels of each image as shown in Equation 2. The exposure value controller 170 extracts an image having the most significant edge or gradient among the plurality of feature images.

$$M = \Sigma \overline{m}_i \quad \text{(Equation 2)}$$

The exposure value controller 170 determines a gamma value of the extracted image as an estimation gamma $\hat{\gamma}$, and changes an exposure parameter of the camera 200 using the estimation gamma $\hat{\gamma}$.

Alternatively, the exposure value controller 170 maps the entire edge/entire gradient (M) with respect to each gamma value γ of the plurality of feature images on a graph, and then generates a relationship graph (refer to the graph shown with reference to numeral 170 in FIG. 1) of the entire edge/entire gradient (M) with respect to gamma values by connecting mapped points through polynomial fitting. In addition, the exposure value controller 170 can determine a gamma value γ that makes the entire edge/entire gradient be the highest edge/gradient as an estimation gamma $\hat{\gamma}$.

When the estimation gamma $\hat{\gamma}$ is smaller than 1, a currently taken image comes out dark. Thus, the exposure value controller 170 controls the camera 200 to increase an exposure level. When the estimation gamma is greater than 1, a currently taken image comes out bright. The exposure value controller 170 then controls the camera 200 to decrease the exposure level. Accordingly, the exposure value controller 170 can calculate a changed exposure value $E_{t+1}$ by using an inversely proportional relationship graph of the estimation gamma $\hat{\gamma}$ and an exposure ratio $$\frac{E_{t+1}}{E_t}$$

shown in FIG. 4A or FIG. 4B.

FIG. 4A is a graph for piece-wire linear update using the estimation gamma, and can be represented as given in Equation 3. In Equation 3, $E_t$ denotes an exposure value of current photographing (time=t) and $E_{t+1}$ denotes an exposure value of the next photographing (time=t+1). $K_p$ is a value for controlling convergence speed of the exposure ratio $$\frac{E_{t+1}}{E_t}$$

to 1, and thus when the value of $K_p$ is increased, a variation range of the exposure value is increased, thereby accelerating the convergence speed. However, in this case, oscillation may occur. $E_t$ may be a value received from the camera 200 or may be a stored value.

$$\frac{E_{t+1}}{E_t} = (1 + \alpha K_p(1 - \hat{\gamma}))$$ (Equation 3)

$$\text{s.t. } \alpha = \begin{cases} 1/2 & \text{for } \hat{\gamma} \geq 1 \\ 1 & \text{for } \hat{\gamma} < 1 \end{cases}$$

FIG. 4B is a nonlinear graph for nonlinear update using the estimation gamma $\hat{\gamma}$, and may be represented as given in Equation 4. In Equation 4, $E_t$ denotes an exposure value of current photographing (time=t), and $E_{t+1}$ denotes an exposure value of the next photographing (time=t+1). $K_p$ is a value of convergence speed of an exposure ratio $$\frac{E_{t+1}}{E_t}$$

to 1, and d denotes a slope angle.

$$R = d \cdot \tan\left((2 - \hat{\gamma}) \cdot a\tan\left(\frac{1}{d}\right) - a\tan\left(\frac{1}{d}\right)\right) + 1$$ (Equation 4)

$$\frac{E_{t+1}}{E_t} = \alpha K_p(R - 1) + 1$$

$$\text{s.t. } \alpha = \begin{cases} 1/2 & \text{for } \hat{\gamma} \geq 1 \\ 1 & \text{for } \hat{\gamma} < 1 \end{cases}$$

As described, the exposure ratio $$\frac{E_{t+1}}{E_t}$$

may be linearly or nonlinearly controlled according to the estimation value $\hat{\gamma}$. In comparison of camera parameter variation according to lighting in a linear control case and a nonlinear control case, oscillation of the camera parameter can be reduced in the nonlinear control case compared to the linear control case. Meanwhile, the linear control has a merit of low complexity compared to the nonlinear control.

The exposure value controller 170 delivers a camera parameter relevant to the modified exposure value $E_{t+1}$ to the camera 200, and repeats exposure control of the camera 200 until the camera exposure is converged to a specific value.

Figure 5:
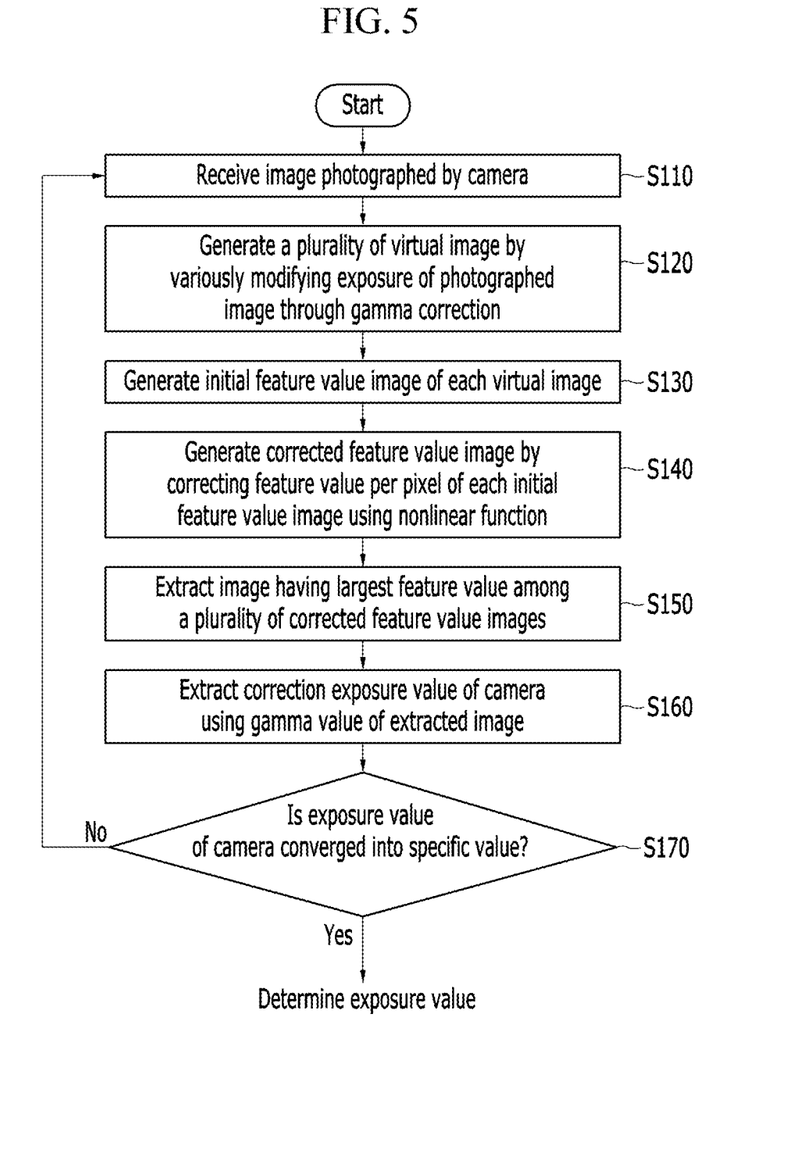
FIG. 5 is a flowchart of a method for adjusting camera exposure according to the exemplary embodiment of the present disclosure.

FIG. 5 is a flowchart of a method for adjusting camera exposure according to the exemplary embodiment of the present disclosure.

Referring to FIG. 5, a camera exposure adjusting apparatus 100 receives an image photographed by a camera 200 (S110).

The camera exposure adjusting apparatus 100 generates a plurality of virtual images by variously changing exposure of the photographed image through gamma correction (S120).

The camera exposure adjusting apparatus 100 generates a feature image that indicates an initial feature of each of the plurality of virtual images (S130). The feature value includes edge information or gradient information extracted from an image.

The camera exposure adjusting apparatus 100 generates a corrected feature image by correcting a feature per pixel of each initial feature image using a nonlinear function (S140). The camera exposure adjusting apparatus 100 corrects a substantial feature $\overline{m}_i$ using FIG. 2 and Equation 1 to a corrected feature $\overline{m}_i$, and a nonlinear function that relatively increases importance of a pixel having a small feature is used.

The camera exposure adjusting apparatus 100 extracts an image having the largest feature among a plurality of corrected feature images (S150). The camera exposure adjusting apparatus 100 calculates a feature value M of the corresponding image by adding up feature values of all pixels as given in Equation 2.

The camera exposure adjusting apparatus 100 determines a gamma value of the extracted image as an estimation gamma value and extracts a corrected exposure value of the camera 200 using the estimation gamma value $\hat{\gamma}$ (S160). When the estimation gamma value $\hat{\gamma}$ is greater than 1, the camera exposure adjusting apparatus 100 extracts an exposure value that is smaller than a current exposure value as a corrected exposure value, and when the estimation gamma value $\hat{\gamma}$ is smaller than 1, the camera exposure adjusting apparatus 100 extracts an exposure value that is greater than the current exposure value as a corrected exposure value. Meanwhile, the camera exposure adjusting apparatus 100 maps a feature value M of each gamma value γ of the plurality of corrected feature images on a graph, and determines a gamma value γ having the maximum feature value M in the graph where the mapped points are connected to each other as an estimation gamma value $\hat{\gamma}$.

The camera exposure adjusting apparatus 100 determines whether the camera exposure is converged into a specific value and then repeats exposure control (S170). That is, the camera exposure adjusting apparatus 100 determines the camera exposure to converge to an optimal value if fluctuation of the camera exposure is included within a specific range. When the camera exposure does not converge to the specific value, the camera exposure adjusting apparatus 100 sets the exposure value of the camera 200 as a corrected exposure value.

As described, the camera exposure adjusting apparatus 100 extracts an optimal exposure value from a virtual image of a photographed image.

Figure 6:
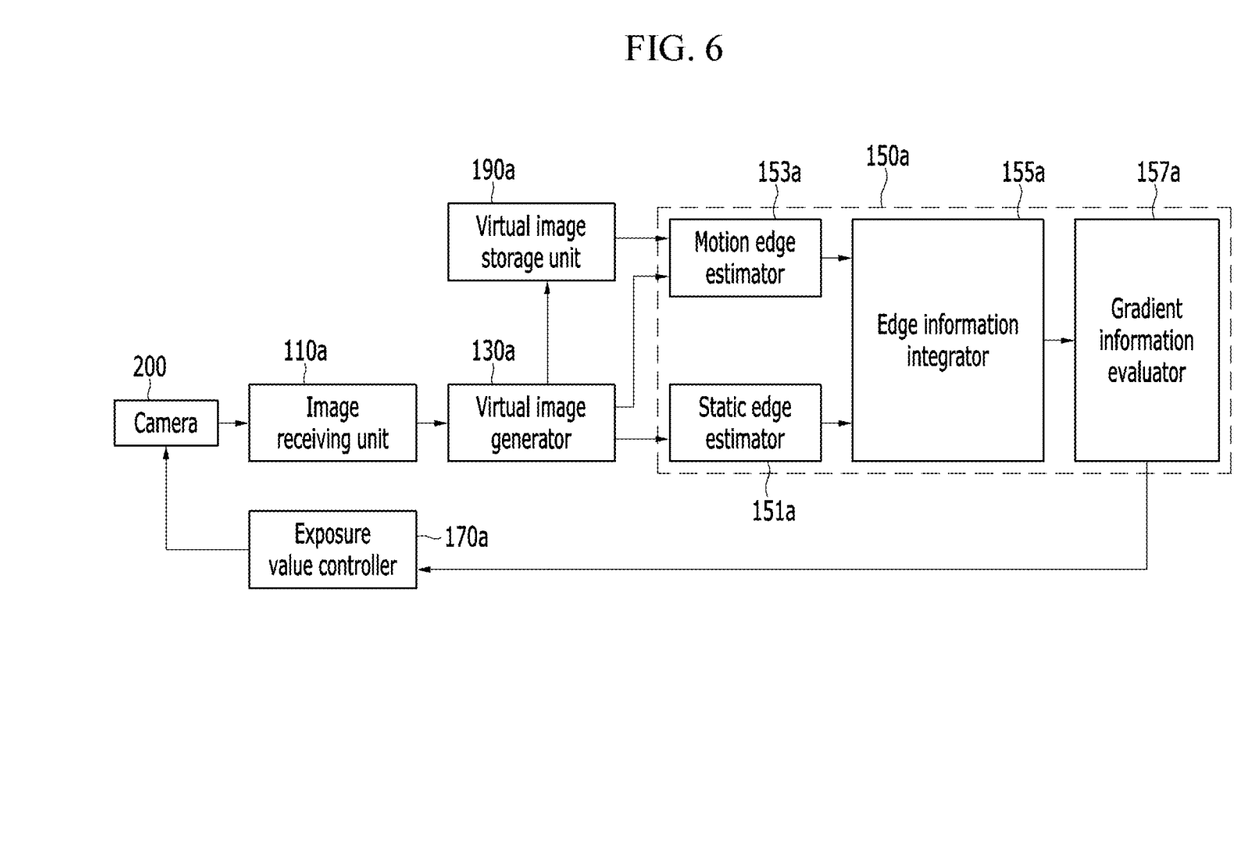
FIG. 6 is a schematic diagram of an apparatus for adjusting camera exposure according to another exemplary embodiment of the present disclosure.

FIG. 6 is a schematic diagram of a camera exposure adjusting apparatus according to another exemplary embodiment of the present disclosure.

Referring to FIG. 6, a camera exposure adjusting apparatus 100A includes an image receiving unit 110A, a virtual image generator 130A, a feature image generator 150A, and an exposure controller 170A. In addition, the camera exposure adjusting apparatus 100A further includes a virtual image storage unit 190A.

The image receiving unit 110A receives an image photographed by a camera 200 with a specific exposure value $E_t$.

The virtual image generator 130A generates a plurality of virtual images by variously changing brightness of a photographed image. The virtual image generator 130A can change intensity of light using gamma correction. The virtual image generator 130A stores the plurality of virtual images in the virtual image storage unit 190A.

The feature image generator 150A generates feature images indicating features (e.g., gradient information) of each of the plurality of virtual images. The feature image generator 150A includes a static edge estimator 151A, a motion edge estimator 153A, an edge information integrator 155A, and a gradient information evaluator 157A.

The static edge estimator 151A estimates an edge of a virtual image generated by the virtual image generator 130A.

The motion edge estimator 153A estimates an edge according to variation of a currently photographed image and a previously photographed image based on a current virtual image generated by the virtual image generator 130A and a previous virtual image stored in the virtual image storage unit 190A. The motion edge estimator 153A retrieves virtual images generated from the previously photographed image from the virtual image storage unit 190A and the current photographed image from the virtual image generator unit 130A.

The edge information integrator 155A integrates edge information of the virtual image estimated by the static edge estimator 151A and the motion edge estimator 153A.

The gradient information evaluator 157A calculates a gradient $m_i$ of the virtual image based on the integrated edge information output from the edge information integrator 155A. A gradient per pixel can be corrected as described with reference to FIG. 3.

The exposure value controller 170A operates similarly to the exposure controller 170 of FIG. 1. That is, the exposure value controller 170A extracts an image having the greatest edge or gradient information among the plurality of feature images generated by the feature image generator 150A. The entire gradient M of the feature image is calculated as given in Equation 2. The exposure value controller 170A may determine a gamma value of the extracted image as an estimation gamma value $\hat{\gamma}$. Alternatively, the exposure value controller 170A may determine a gamma value having the maximum entire gradient in a relationship graph (e.g., the graph 170 shown in FIG. 1) of the entire gradient with respect to gamma values as an estimation gamma value $\hat{\gamma}$.

The exposure value controller 170A calculates a changed exposure value $E_{t+1}$ of the camera 200 based on an inversely proportional relationship graph of the estimation gamma value $\hat{\gamma}$ and an exposure ratio $$\frac{E_{t+1}}{E_t}.$$

The exposure value controller 170A delivers a camera parameter relevant to the changed exposure value $E_{t+1}$ to the camera 200. Here, the camera parameter is an exposure value. As described, the camera parameter relevant to exposure is iteratively changed so as to converge into an optimal value.

Figure 7:
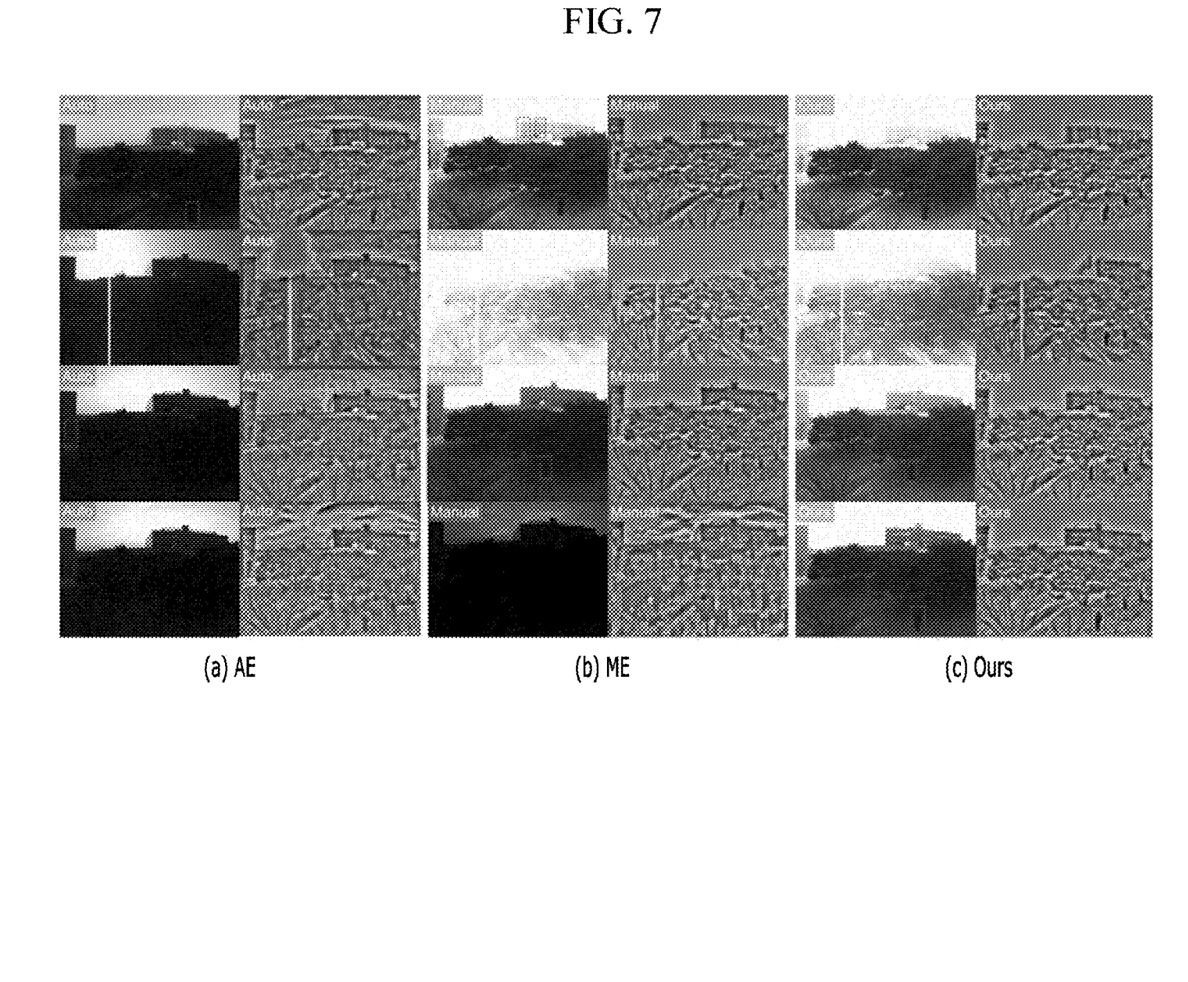
FIG. 7 and FIG. 8 show a comparison between the method according to the exemplary embodiment of the present disclosure and a conventional method.
Figure 8:
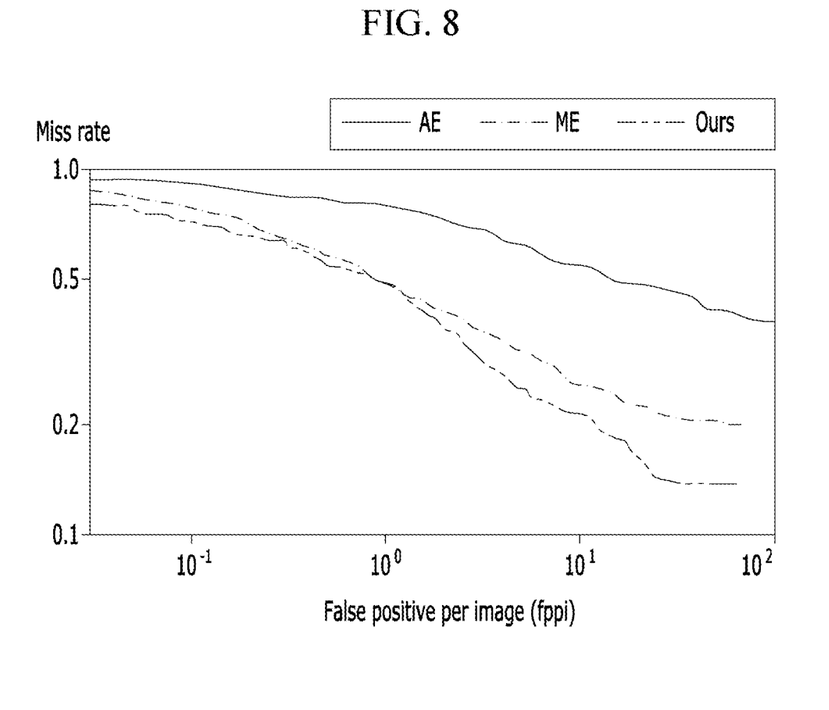

FIG. 7 and FIG. 8 show a comparison between a method according to the exemplary embodiment of the present disclosure and a conventional method.

Referring to FIG. 7, an auto-exposure (AE) adjusting method, a manual-exposure (ME) adjusting method, and the exposure adjusting method according to the present disclosure are used to take photographs of the same scene over time. In addition, it can be observed than a specific object can be precisely detected from a photographed image using the exposure adjusting method according to the exemplary embodiment of the present disclosure when features of each image are visualized using HOGgles.

FIG. 8 is a graph of quantitative evaluation of the result of FIG. 7, and it can be observed from the graph that performance of the exposure adjusting method according to the exemplary embodiment of the present disclosure is improved compared to other methods (i.e., AE and ME).

Figure 9:
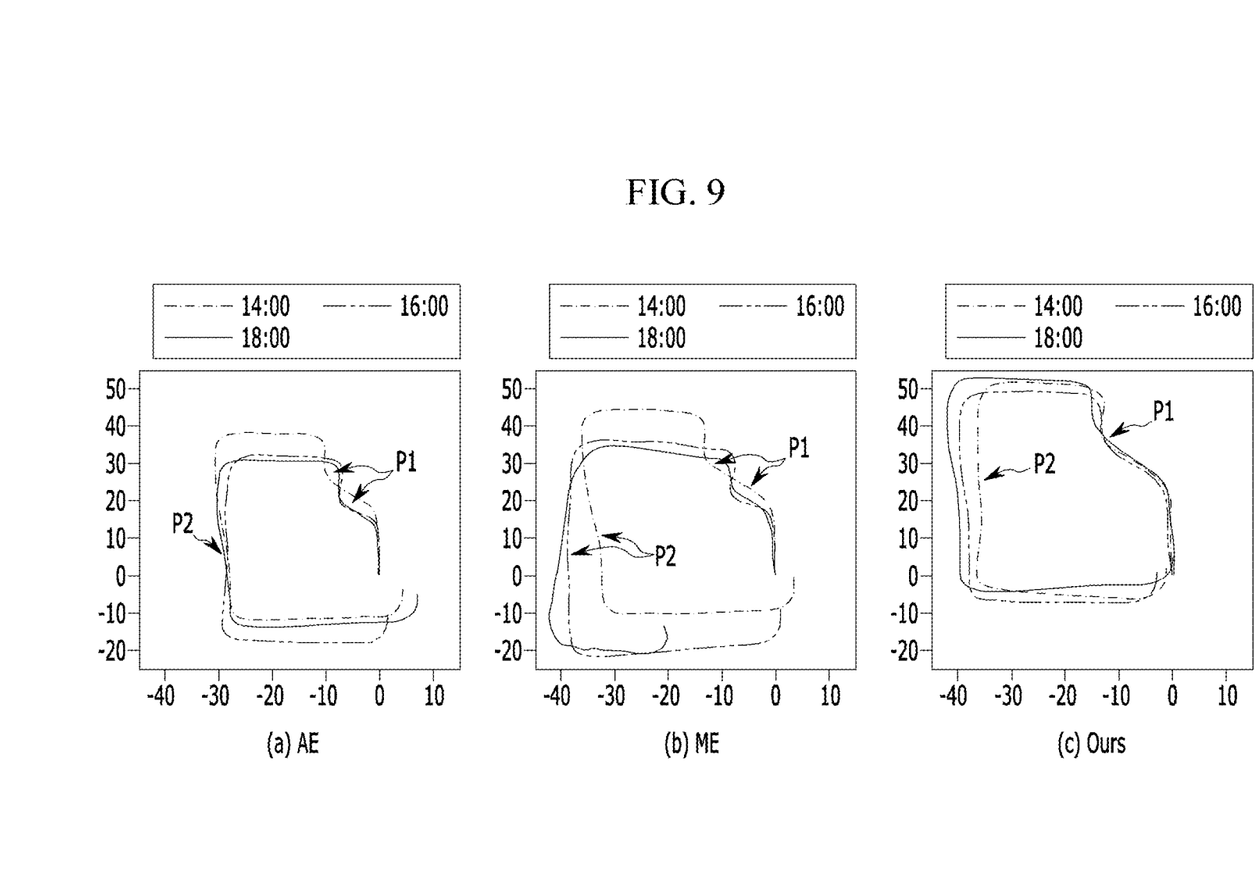
FIG. 9 shows another comparison between the method according to the exemplary embodiment of the present disclosure and a conventional method.

FIG. 9 shows another comparison between the method according to the exemplary embodiment of the present disclosure and a conventional method.

Referring to FIG. 9, an auto-exposure (AE) adjusting method, a manual-exposure (ME) adjusting method, and the exposure adjusting method according to the present disclosure are used to take a photograph of an object over time while moving along a closed-end path. It can be observed that the exposure adjusting method according to the exemplary embodiment of the present disclosure precisely extracts the path compared to the other methods (i.e., AE and ME).

Figure 10:
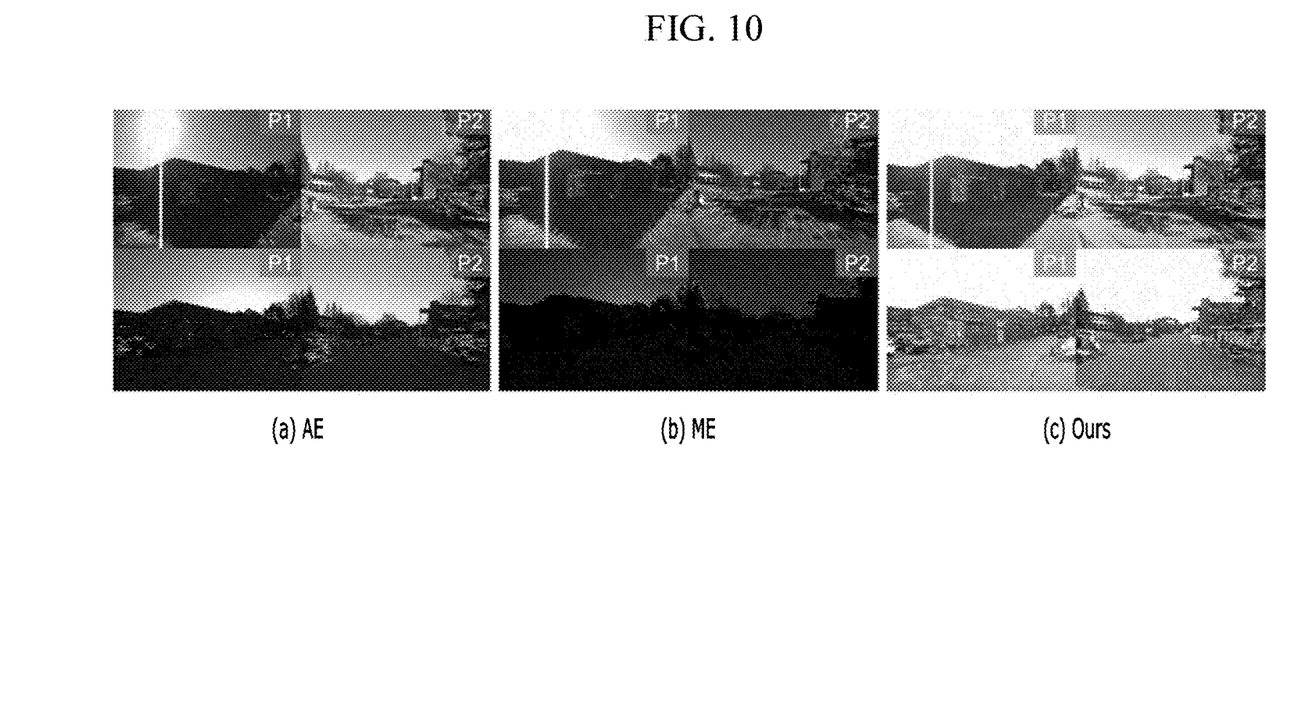
FIG. 10 shows another comparison between the method according to the exemplary embodiment of the present disclosure and a conventional method.

FIG. 10 shows another comparison between the method according to the exemplary embodiment of the present disclosure and a conventional method.

Referring to FIG. 10, specific points P1 and P2 are photographed over time using an auto-exposure (AE) adjusting method, a manual-exposure (ME) adjusting method, and the exposure adjusting method according to the present disclosure. The green line in each image indicates features tracked between adjacent frames.

As described, instead of determining camera exposure using intensity of light as in a conventional method, the camera exposure is determined using unique features of an image in the exemplary embodiment of the present disclosure, and accordingly, an image that is more tolerant to a lighting environment can be acquired.

Light intensity and exposure are proportional to each other, and therefore the conventional exposure adjusting method determines an exposure value by estimating intensity of light. However, such a method has a drawback of sensitivity to a lighting environment, and methods that have been developed and researched to solve the problem also have a limit of a photographing environment. The camera exposure adjusting apparatus 100 according to the exemplary embodiment of the present disclosure, however, adjusts camera exposure using image features that are robust to a lighting environment and motion, thereby providing an excellent effect compared to the conventional method.

The above-described embodiments can be realized through a program for realizing functions corresponding to the configuration of the embodiments or a recording medium for recording the program in addition to through the above-described device and/or method, which is easily realized by a person skilled in the art.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An apparatus for adjusting camera exposure, comprising:
   a virtual image generator that generates a plurality of virtual images by applying gamma correction using a plurality of gamma values on an image photographed by a camera at a first exposure value;
   a feature image generator that generates a plurality of feature images respectively indicating features of the plurality of virtual images; and
   an exposure controller that estimates target gamma value to maximize feature value of the photographed image based on a relation of feature values and gamma values of the plurality of feature images, and changes the first exposure value to a second exposure value based on the target gamma value,
   wherein the exposure controller determines the second exposure value to be smaller than the first exposure value when the target gamma value is greater than a reference value, and determines the second exposure value to be greater than the first exposure value when the target gamma value is smaller than reference value.

2. The apparatus for adjusting camera exposure of claim 1, wherein the feature value comprises edge information or gradient information, and
   the feature image generator generates a feature image corresponding to each virtual image by extracting a feature per pixel of each virtual image.

3. The apparatus for adjusting camera exposure of claim 2, wherein the feature image generator extracts an initial feature value per pixel of each virtual image and relatively corrects the initial feature value using a nonlinear function, and
   the nonlinear function is a function that restricts feature noises and relatively increases importance of a pixel having a smaller initial feature value.

4. The apparatus for adjusting camera exposure of claim 2, wherein the exposure value controller calculates a total feature value of the corresponding feature image by adding up a feature value per pixel of each feature image, and estimates gamma value of an image having the greatest total feature value among the plurality of feature images as the target gamma value.

5. The apparatus for adjusting camera exposure of claim 2, wherein the exposure value controller calculates a total feature value of the corresponding feature image by adding up a feature value per pixel of each feature image, generates a relationship graph of feature values and gamma value by connecting points respectively corresponding to gamma value and total feature value of each of the plurality of feature value images, and estimates gamma value of the greatest total feature value in the graph as the target gamma value.

6. The apparatus for adjusting camera exposure of claim 1, wherein the exposure value controller iteratively adjusts camera exposure until a difference between the target gamma value and gamma value of the photographed image converges to a certain range.

7. The apparatus for adjusting camera exposure of claim 1, wherein the virtual image generator generates a virtual image corresponding to each gamma value by changing brightness of the photographed image using a plurality of gamma values used in gamma correction, and
   the exposure value controller extracts an estimation gamma value that corresponds to the maximum feature value using a relationship between a feature value acquired from the plurality of feature images and gamma values, increases camera exposure to be greater than an exposure value of the photographed image when the estimation gamma value is smaller than 1, and decreases the camera exposure to be lower than the exposure value of the photographed image when the estimation gamma value is greater than 1, and
   the photographed image becomes darker when the gamma value is greater than 1 and the photographed image becomes brighter when the gamma value is smaller than 1 through the gamma correction.

8. The apparatus for adjusting camera exposure of claim 7, wherein the feature image generator generates a feature image including gradient information per pixel of each virtual image.

9. The apparatus for adjusting camera exposure of claim 8, wherein the exposure value controller calculates a total gradient of a feature image corresponding to each virtual image, and extracts a gamma value of a virtual image having the greatest total gradient as the estimation gamma value.

10. A method for adjusting camera exposure by an apparatus, comprising:
   generating a plurality of virtual images by applying a plurality of gamma values used in gamma correction to an image photographed by a camera;
   calculating a feature value indicating edge or gradient information of each of the plurality of virtual images;
   estimating target gamma value that corresponds to the maximum feature value using a relationship between feature values of the plurality of virtual images and gamma values of the plurality of virtual images; and
   determining an exposure value of the camera based on the target gamma value,
   wherein the photographed image becomes darker when an applied gamma value is greater than 1 and the photographed image becomes brighter when the applied gamma value is smaller than 1 through the gamma correction.

11. The method for adjusting camera exposure of claim 10, wherein the calculating the feature value comprises calculating a total feature value of the corresponding virtual image by adding up a feature value per pixel of each virtual image.

12. The method for adjusting camera exposure of claim 11, wherein the determining the exposure value of the camera comprises:
   generating a relationship graph by connecting points that correspond to gamma value and a total feature value of each of the plurality of virtual images;
   extracting the target gamma value having the maximum feature value in the graph; and
   increasing the camera exposure to be greater than an exposure value of the photographed image when the target gamma value is smaller than 1 and decreasing the camera exposure to be lower than the exposure value of the photographed image when the target gamma value is greater than 1.

13. The method for adjusting camera exposure of claim 11, wherein the determining the exposure value of the camera comprises:
   extracting a virtual image having the greatest total feature value among the plurality of virtual images;
   extracting gamma value of the extracted virtual image as the target gamma value; and
   increasing the camera exposure to be greater than the exposure value of the photographed image when the target gamma value is smaller than 1 and decreasing the camera exposure to be lower than the exposure value of the photographed image when the target gamma value is greater than 1.

14. A method for adjusting camera exposure by an apparatus, comprising:
   receiving a first image photographed by a camera with a first exposure value;
   extracting a relationship graph of gamma values and gradient information that indicates edge information of an image using a plurality of virtual images acquired by performing gamma correction on the first image; and
   changing the first exposure value to a second exposure value based on a target gamma value extracted from the relationship graph,
   wherein the changing the first exposure value to the second exposure value comprises:
   determining a gamma value having the maximum total gradient value in the relationship graph as the target gamma value; and
   when the target gamma value is greater than 1, a value that is smaller than the first exposure value is determined to be the second exposure value, and when the target gamma value is smaller than 1, a value that is greater than the first exposure value is determining to be the second exposure value.

15. The method for adjusting camera exposure of claim 14, wherein the extracting the relationship graph comprises:
   generating a plurality of virtual image by gamma-correcting the first image;
   extracting a total gradient value of each of the plurality of virtual images; and
   generating the relationship graph by connecting points that correspond to gamma values of the respective virtual images and total gradient values,
   wherein a total gradient value of each virtual image is acquired by adding up a gradient value per pixel of the corresponding virtual image.

16. The method for adjusting camera exposure of claim 14, wherein the target gamma value is a gamma value that maximizes gradient information of the first image in the relationship graph.

17. The method for adjusting camera exposure of claim 14, wherein the changing to the second exposure value comprises extracting an exposure ratio that corresponds to the target gamma value based on an inversely proportional graph of a gamma value and an exposure ratio, and
   the exposure ratio is a ratio of the second exposure value with respect to the first exposure value.

* * * * *